United States Patent
Delorenzis

(10) Patent No.: US 9,139,061 B2
(45) Date of Patent: Sep. 22, 2015

(54) VEHICLE SUSPENSION SYSTEM WITH RESERVOIR FOR AIR SPRING DAMPING

(71) Applicant: WATSON & CHALIN MANUFACTURING, INC., McKinney, TX (US)

(72) Inventor: Damon Delorenzis, McKinney, TX (US)

(73) Assignees: Watson & Chalin Manufacturing, Inc., McKinney, TX (US); Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/855,788

(22) Filed: Apr. 3, 2013

(65) Prior Publication Data
US 2014/0300075 A1    Oct. 9, 2014

(51) Int. Cl.
*B60G 11/30* (2006.01)
*B60G 17/052* (2006.01)
*F16F 9/04* (2006.01)

(52) U.S. Cl.
CPC .............. *B60G 11/30* (2013.01); *B60G 17/052* (2013.01); *F16F 9/049* (2013.01); *B60G 2200/445* (2013.01); *B60G 2202/152* (2013.01); *B60G 2204/201* (2013.01); *B60G 2300/026* (2013.01); *B60G 2300/042* (2013.01); *B60G 2500/20* (2013.01)

(58) Field of Classification Search
CPC .............. B60G 11/30; B60G 17/0528; B60G 17/0432; B60G 2500/2041; B60B 35/08; F16F 9/049
USPC .................................................. 280/124.159
See application file for complete search history.

(56) References Cited

U.S. PATENT DOCUMENTS

| | | | |
|---|---|---|---|
| 1,436,144 A * | 11/1922 | Bernat | 267/64.23 |
| 1,464,441 A * | 8/1923 | Osborn | 152/418 |
| 1,516,004 A | 11/1924 | Eckrode et al. | |
| 2,611,656 A * | 9/1952 | Vanderberg | 301/124.1 |
| 2,694,569 A | 11/1954 | Gouirand | |
| 2,773,686 A | 12/1956 | Nash | |

(Continued)

FOREIGN PATENT DOCUMENTS

| | | |
|---|---|---|
| DE | 4222922 A1 | 7/1993 |
| DE | 102009051944 A1 | 6/2010 |

(Continued)

OTHER PUBLICATIONS

JPO & JAPIO, English Abstract issued Jan. 8, 1992 for JP Publication No. 04004332, 1 page.

(Continued)

*Primary Examiner* — Drew Brown
*Assistant Examiner* — Timothy Wilhelm
(74) *Attorney, Agent, or Firm* — Smith IP Services, P.C.

(57) ABSTRACT

A suspension system can include an air spring, an air reservoir external to the air spring, and a flow control device which variably restricts flow of air between the air spring and the air reservoir. Flow between the air spring and the air reservoir may be permitted in response to compliance of the suspension system, and the air spring can have an internal air volume at least 2½ times as great as a volume of the air reservoir. The flow control device may permit flow between the air spring and the air reservoir in response to a predetermined pressure differential level across the flow control device. Multiple air reservoirs can be internal to an axle, and can be isolated from each other in the axle.

32 Claims, 13 Drawing Sheets

(56) References Cited

U.S. PATENT DOCUMENTS

| | | | |
|---|---|---|---|
| 2,827,283 A | 3/1958 | Browne et al. | |
| 2,874,647 A * | 2/1959 | Candlin, Jr. | 105/171 |
| 2,901,241 A * | 8/1959 | Lautzenhiser et al. | 267/186 |
| 2,902,291 A | 9/1959 | Walker | |
| 2,979,326 A | 4/1961 | Wilson, Jr. | |
| 2,984,476 A | 5/1961 | Turner | |
| 3,000,400 A * | 9/1961 | Cislo | 137/627.5 |
| 3,063,732 A | 11/1962 | Harbers et al. | |
| 3,190,635 A | 6/1965 | Wustenhagen et al. | |
| 3,212,769 A | 10/1965 | Ishibashi et al. | |
| 3,395,931 A | 8/1968 | Piret | |
| 3,424,449 A | 1/1969 | Strifler | |
| 3,880,445 A | 4/1975 | Chieger | |
| 3,904,181 A | 9/1975 | Hársy-Vadas | |
| 3,936,881 A | 2/1976 | Orlando et al. | |
| 4,045,009 A | 8/1977 | Pees | |
| 4,273,358 A | 6/1981 | Taft | |
| 4,322,086 A | 3/1982 | Bennink | |
| 4,383,679 A | 5/1983 | Kakimoto | |
| 4,407,491 A | 10/1983 | Kunihiro et al. | |
| 4,478,244 A | 10/1984 | Garrett | |
| 4,493,481 A | 1/1985 | Merkle | |
| 4,717,170 A | 1/1988 | Mounier-Poulat et al. | |
| 4,762,308 A * | 8/1988 | Geno | 267/64.27 |
| 4,844,428 A | 7/1989 | Margolis et al. | |
| 4,932,210 A | 6/1990 | Julien et al. | |
| 5,087,020 A | 2/1992 | Weber et al. | |
| 5,217,210 A * | 6/1993 | Schutzner | 267/64.16 |
| 5,234,203 A | 8/1993 | Smith | |
| 5,374,077 A * | 12/1994 | Penzotti et al. | 280/683 |
| 5,382,006 A | 1/1995 | Arnold | |
| 5,403,031 A | 4/1995 | Gottschalk et al. | |
| 5,482,135 A | 1/1996 | Phillips et al. | |
| 5,632,471 A * | 5/1997 | Pradel | 267/64.11 |
| 5,873,581 A | 2/1999 | Yale | |
| 5,921,899 A | 7/1999 | Rose | |
| 5,954,316 A | 9/1999 | Voss | |
| 6,102,378 A | 8/2000 | Gieseler et al. | |
| 6,149,142 A | 11/2000 | Penzotti | |
| 6,240,339 B1 | 5/2001 | Von Mayenburg et al. | |
| 6,398,236 B1 * | 6/2002 | Richardson | 280/86.5 |
| 6,412,758 B1 | 7/2002 | Wenzel et al. | |
| 6,412,789 B1 | 7/2002 | Pierce et al. | |
| 6,644,632 B1 | 11/2003 | Jaberg | |
| 6,698,730 B2 | 3/2004 | Easter | |
| 6,715,744 B2 | 4/2004 | Bell | |
| 6,746,031 B2 * | 6/2004 | Carlstedt | 280/124.107 |
| 6,883,810 B2 | 4/2005 | Svartz et al. | |
| 7,036,835 B2 * | 5/2006 | Coombs et al. | 280/124.154 |
| 7,051,777 B2 | 5/2006 | Tarasinski et al. | |
| 7,140,601 B2 | 11/2006 | Nesbitt et al. | |
| 7,150,450 B2 | 12/2006 | Bell et al. | |
| 7,261,303 B2 * | 8/2007 | Stefan et al. | 280/5.5 |
| 7,338,550 B2 * | 3/2008 | Hoffman | 95/148 |
| 7,510,197 B2 * | 3/2009 | Gottschalk | 280/86.5 |
| 7,530,577 B2 | 5/2009 | Sandbulte et al. | |
| 7,547,179 B1 * | 6/2009 | Edmonson | 414/563 |
| 7,886,882 B2 * | 2/2011 | Behmenburg et al. | 188/282.4 |
| 8,191,903 B2 | 6/2012 | Beuermann et al. | |
| 2002/0074746 A1 | 6/2002 | Eberling et al. | |
| 2004/0032065 A1 | 2/2004 | Leonard | |
| 2004/0084858 A1 | 5/2004 | Svartz et al. | |
| 2004/0245687 A1 | 12/2004 | Sendrea et al. | |
| 2004/0251653 A1 * | 12/2004 | Momiyama | 280/124.157 |
| 2006/0186586 A1 | 8/2006 | Soles et al. | |
| 2007/0290461 A1 * | 12/2007 | Oscarsson | 280/6.15 |
| 2008/0238017 A1 | 10/2008 | Sandbulte et al. | |
| 2010/0163357 A1 * | 7/2010 | Hunter | 188/319.2 |
| 2010/0276852 A1 | 11/2010 | Beuermann et al. | |
| 2011/0049774 A1 | 3/2011 | Naber | |
| 2011/0115140 A1 | 5/2011 | Moulik et al. | |
| 2012/0061887 A1 | 3/2012 | Westnedge et al. | |
| 2012/0291626 A1 | 11/2012 | Westnedge et al. | |
| 2013/0099459 A1 * | 4/2013 | Remboski et al. | 280/124.16 |
| 2013/0139911 A1 * | 6/2013 | Wilson et al. | 137/511 |
| 2014/0300076 A1 | 10/2014 | Fulton et al. | |

FOREIGN PATENT DOCUMENTS

| | | |
|---|---|---|
| EP | 0080561 A1 | 6/1983 |
| EP | 0166702 A2 | 1/1986 |
| EP | 0474171 A1 | 3/1992 |
| EP | 1203676 A1 | 5/2002 |
| EP | 1571015 A2 | 5/2005 |
| EP | 1647425 B1 | 8/2005 |
| FR | 2678867 A1 | 1/1993 |
| GB | 2333576 A | 7/1998 |
| JP | 04004332 A | 1/1992 |
| WO | 7900411 A1 | 7/1979 |
| WO | 2014165466 A1 | 10/2014 |

OTHER PUBLICATIONS

Firestone Industrial Products Company, "AIRIDE Design Guide", technical manual, 1992, 83 pages.

Geick, "Riding on Air: A History of Air Suspension", 1999, 10 pages, title page, bibliography, pp. 101-107, 135, Society of Automotive Engineers Inc., Warrendale, PA.

Office Action issued Sep. 25, 2014 for U.S. Appl. No. 14/187,604, 18 pages.

Quaglia and Sorli, "Experimental and Theoretical Analysis of an Air Spring With Auxiliary Reservoir", article, undated, 7 pages.

Search Report issued Aug. 28, 2014 for International Application PCT/US14/32452, 2 pages.

Search Report and Written Opinion issued Aug. 19, 2014 for International Application PCT/US14/32450, 21 pages.

Office Action issued May 19, 2015 for U.S. Appl. No. 14/187,604, 10 pages.

* cited by examiner

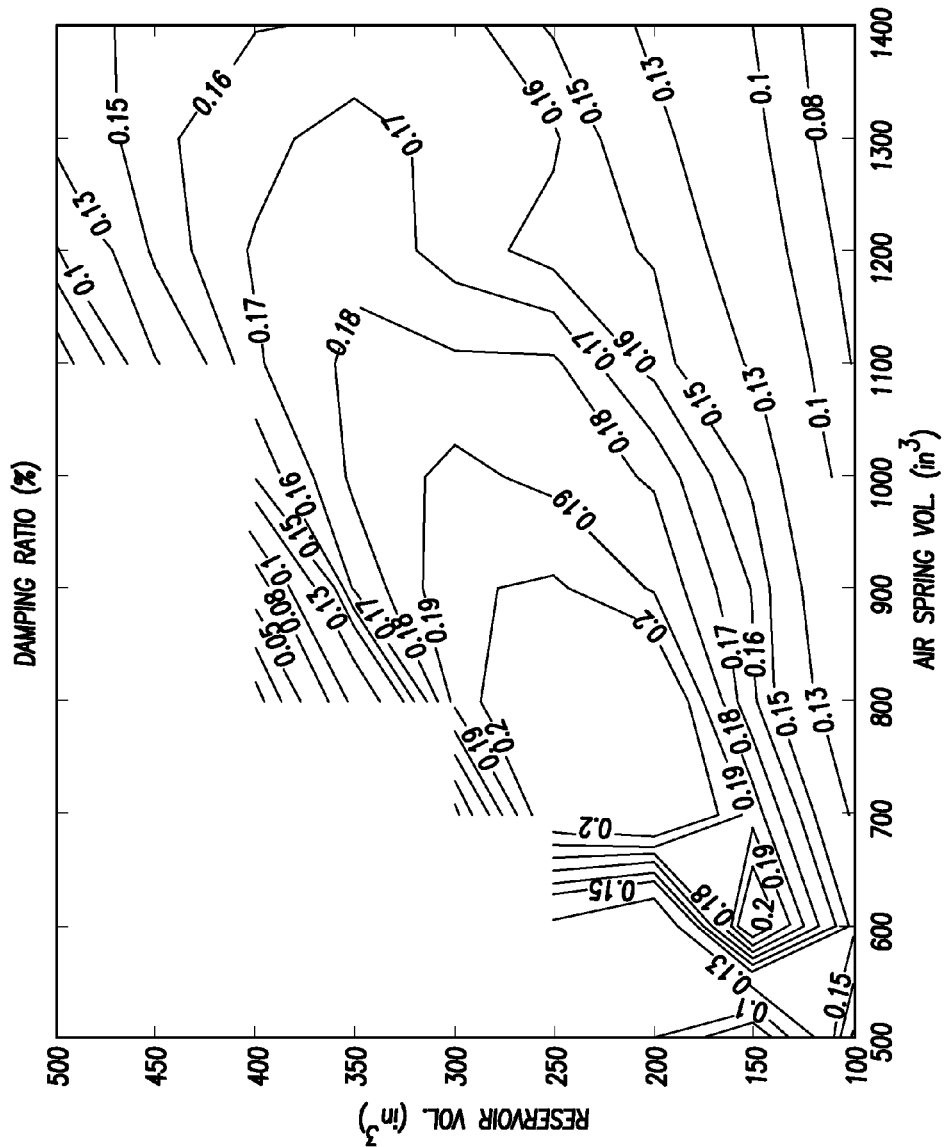

VEHICLE SUSPENSION SYSTEM WITH RESERVOIR FOR AIR SPRING DAMPING

BACKGROUND

This disclosure relates generally to vehicle suspension systems and, in an example described below, more particularly provides a reservoir for air spring damping in a suspension system.

It is known to dampen deflection of a suspension system equipped with air springs. In one technique, a reservoir is provided internally to an air spring so that, as the air spring is compressed and extended during suspension system compliance, air is transferred back and forth between the reservoir and an internal volume of the air spring.

However, in some situations, sufficient volume is not available in an air spring for an internal damping reservoir. In addition, prior designs with internal damping reservoirs have not achieved a desired damping ratio for comfortable and safe vehicle use.

Therefore, it will be appreciated that improvements are needed in the art of damping suspension systems with air springs.

BRIEF DESCRIPTION OF THE DRAWINGS

FIGS. 8A-F are representative graphs of damping ratio versus reservoir and air spring volumes for the suspension system with various axle loadings.

DETAILED DESCRIPTION

Figure 1:
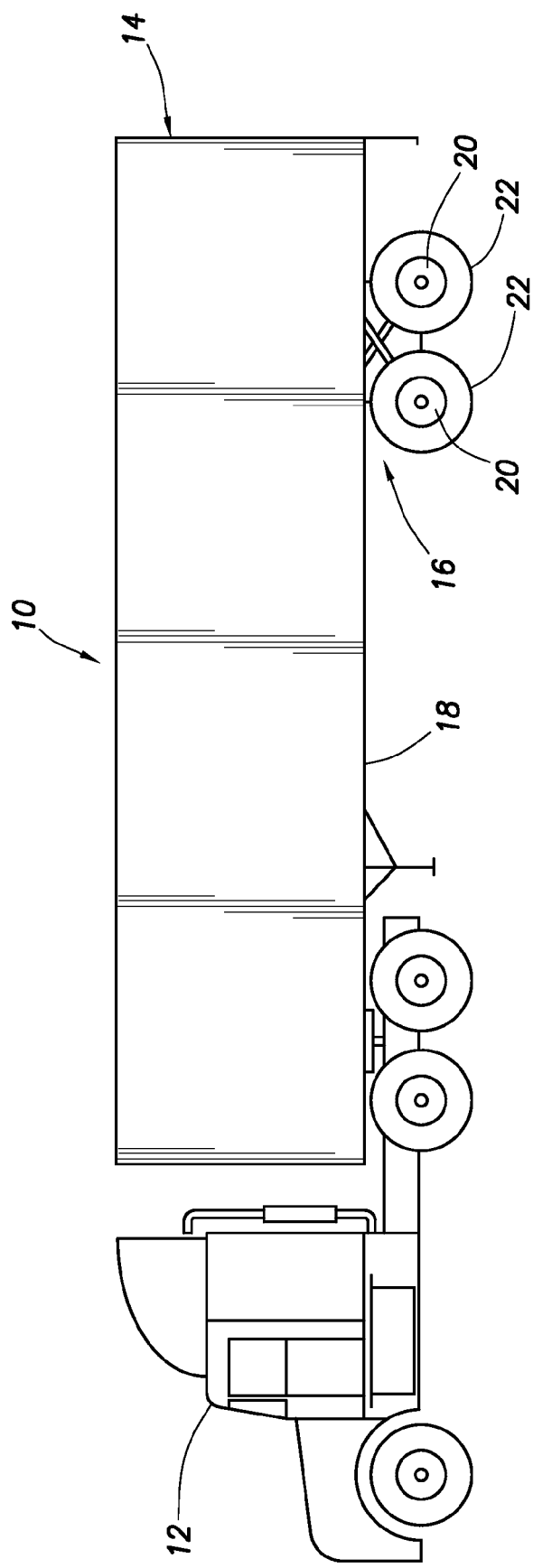
FIG. 1 is a representative partially cross-sectional view of a vehicle which can embody principles of this disclosure.

Representatively illustrated in FIG. 1 is a vehicle 10 which can embody principles of this disclosure. However, it should be clearly understood that the vehicle 10 is merely one example of an application of the principles of this disclosure in practice, and a wide variety of other examples are possible. Therefore, the scope of this disclosure is not limited at all to the details of the vehicle 10 described herein and/or depicted in the drawings.

The vehicle 10 is depicted as including a tractor 12 and a trailer 14. However, it is contemplated that the principles of this disclosure can be incorporated into a trailer of any type (as well as other types of vehicles), and so the term "vehicle" is used herein to refer to trailers of various types, as well as to refer to self-propelled vehicles.

The trailer 14 of FIG. 1 includes multiple suspension systems 16 which suspend a frame 18 of the trailer above a road surface. Wheels 20 and tires 22 are rotatably mounted at each end of each suspension system 16. None, any or all of the suspension systems 16 may be liftable (so that the wheels 20 can be raised out of contact with a road surface).

Figure 2:
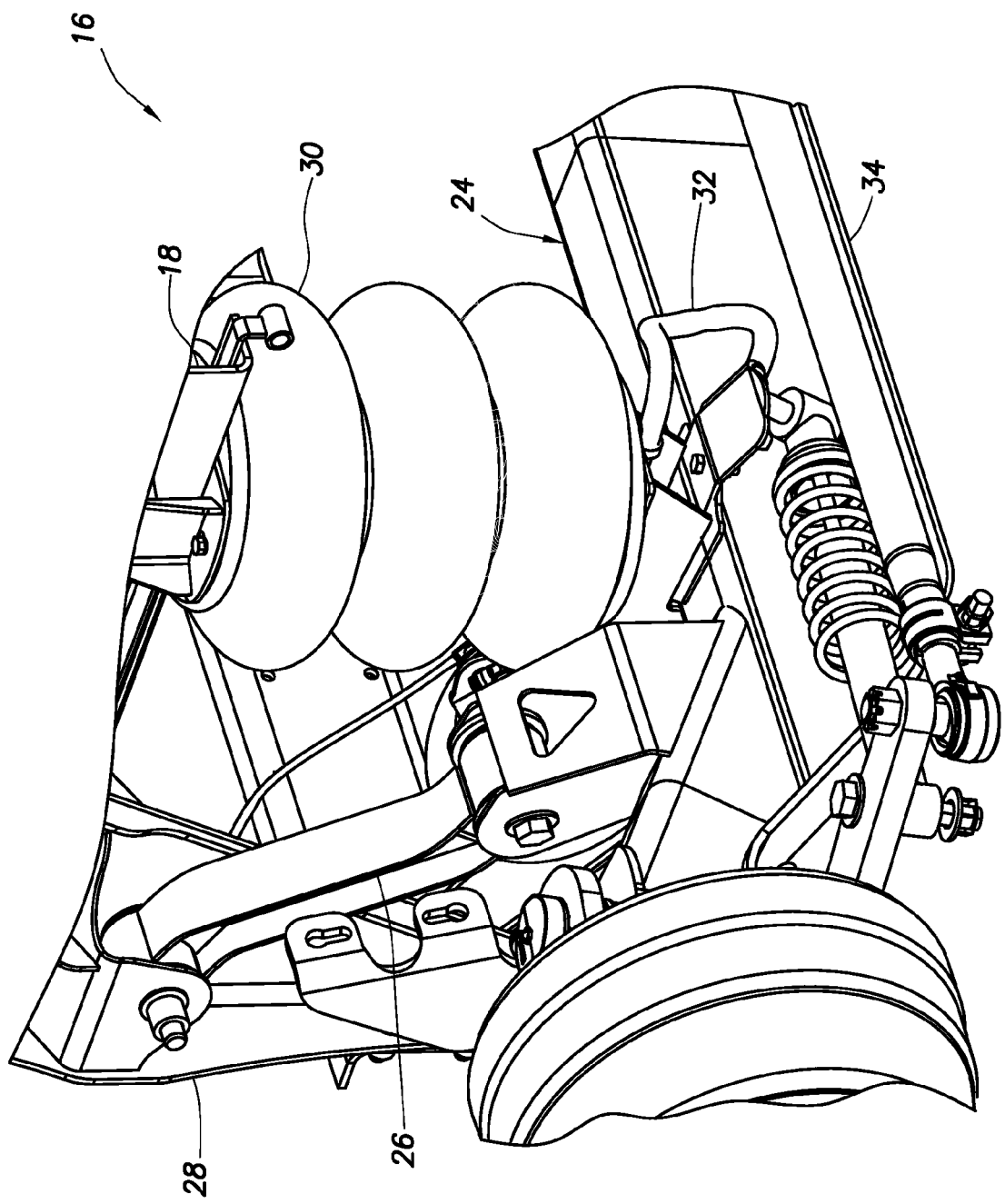
FIG. 2 is a representative perspective view of a suspension system which may be used in the vehicle of FIG. 1.

Referring additionally now to FIG. 2, an example of one of the suspension systems 16 is representatively illustrated. Only one lateral side of the suspension system 16 is depicted in FIG. 2, it being understood that an opposite side of the suspension system is substantially a mirror-image of the portion depicted in FIG. 2.

In this example, the suspension system 16 includes a laterally extending axle 24. The wheels 20 and tires 22 (not visible in FIG. 2, see FIG. 1) are rotatably mounted at opposite ends of the axle 24, for example, with conventional hubs, spindles, bearings, king pins (if the suspension system 16 is steerable), etc.

The suspension system 16 example depicted in FIG. 2 is steerable, with a fabricated liftable axle pivotably connected by parallel or semi-parallel arms 26 to hanger brackets 28 attached to the frame 18, but other types of suspension systems may be used. For example, spring beam, non-liftable, non-steerable, solid axle, and other types of suspension systems can benefit from the principles of this disclosure. Thus, the scope of this disclosure is not limited to use with any particular type of suspension system.

An air spring 30 applies an upwardly biasing force to the frame 18, thereby suspending the frame over the axle 24. In this example, the air spring 30 is a convoluted air spring and has an internal air volume which is connected to an internal volume of the axle 24 (e.g., via a hose 32 and a flow control device not visible in FIG. 2). Thus, the axle 24 comprises an external air reservoir, which can be used to control damping characteristics of the air spring 30, as described more fully below.

Typically, a convoluted air spring is used in situations where long travel and low compressed height are desired. As such, the internal air volume of a convoluted air spring is usually insufficient to provide a suitable damping air reservoir in the air spring.

In the FIG. 2 example, the external air reservoir provided by the axle 24 solves the problem of insufficient volume within the air spring 30, and conveniently utilizes the existing axle component. However, it should be clearly understood that the scope of this disclosure is not limited to use with any particular type of air spring or external air reservoir.

Figure 3:
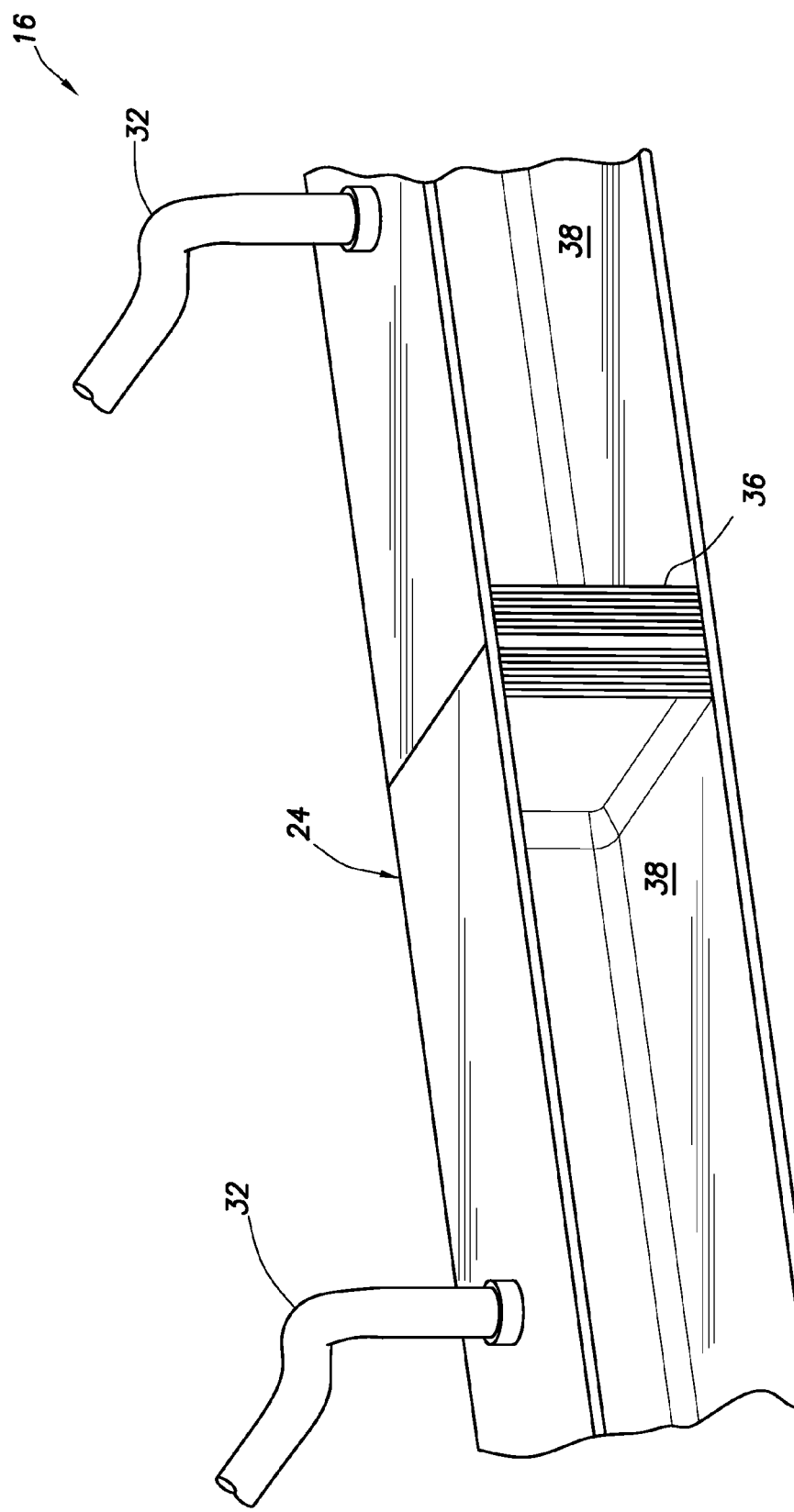
FIG. 3 is a representative perspective view of a center section of an axle of the suspension system.

Referring additionally now to FIG. 3, the axle 24 is representatively illustrated, apart from the remainder of the suspension system 16. A perspective bottom view of the axle 24 is depicted in FIG. 3, with a bottom plate 34 (not shown in FIG. 3, see FIG. 2) removed.

In this view it may be seen that the interior of the axle 24 is generally hollow. A partition 36 separates individual air reservoirs 38 in the axle 24. One of the air reservoirs 38 is connected to a corresponding one of the air springs 30 via a hose 32, and the other of the air reservoirs is connected to a corresponding other one of the air springs via another hose.

By isolating the air reservoirs 38 from each other in the axle 24, changes in pressure in one reservoir will not affect pressure in the other reservoir. This prevents one air spring's dynamics from affecting the other air spring during compliance of the suspension system 16 (e.g., when the axle 24 displaces relative to the frame 18 and the air spring 30 compresses or elongates).

In one example, the partition 36 could be made of a material (such as plastic, soft metal, etc.) which will soften when the bottom plate 34 is welded to the rest of the axle 24, thereby heating the axle and partition. In this manner, the partition 36 can conform to an interior surface of the axle 24, so that the air reservoirs 38 are better isolated from each other.

However, other materials and other techniques for isolating the air reservoirs 38 from each other may be used, in keeping with the scope of this disclosure. For example, an elastomer could be provided on the partition 38 for sealing against the interior surface of the axle 24, the partition could be welded, bonded or molded into the axle, etc.

Figure 4:
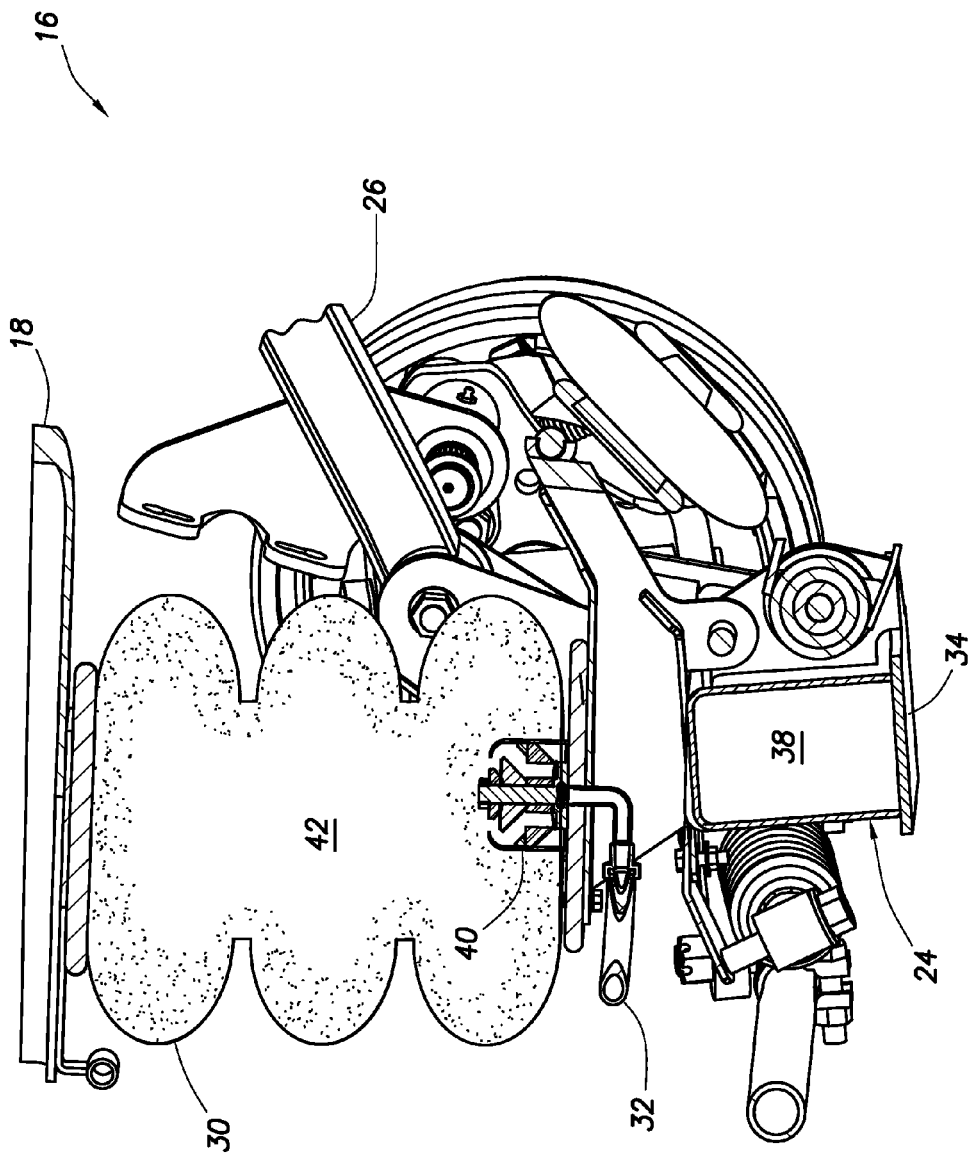
FIG. 4 is a representative cross-sectional view of an air spring and axle portion of the suspension system.

Referring additionally now to FIG. 4, a cross-sectional view of the suspension system 16 is representatively illustrated. In this view it may be seen that a flow control device 40 controls flow of air between the corresponding air reservoir 38 in the axle 24 and an internal air volume 42 of the air spring 30.

Although the device 40 is depicted in FIG. 4 as being positioned internal to the air spring 30 and between the internal air volume 42 and the hose 32, it will be appreciated that these positions could be changed if desired. For example, the device 40 could be external to the air spring 30, internal to the axle 24, at an interface between the air spring and the axle, at an opposite end of the hose 32, etc. Thus, the scope of this disclosure is not limited to any particular configuration or arrangement of the device 40 with respect to other components of the suspension system 16.

In one example, the device 40 can variably restrict flow of air between the internal air volume 42 and the reservoir 38, to thereby beneficially affect the damping characteristics of the suspension system 16. For example, the device 40 can maintain up to a threshold pressure differential between the internal air volume 42 and the reservoir 38 in either direction of flow, as described more fully below.

Figure 5:
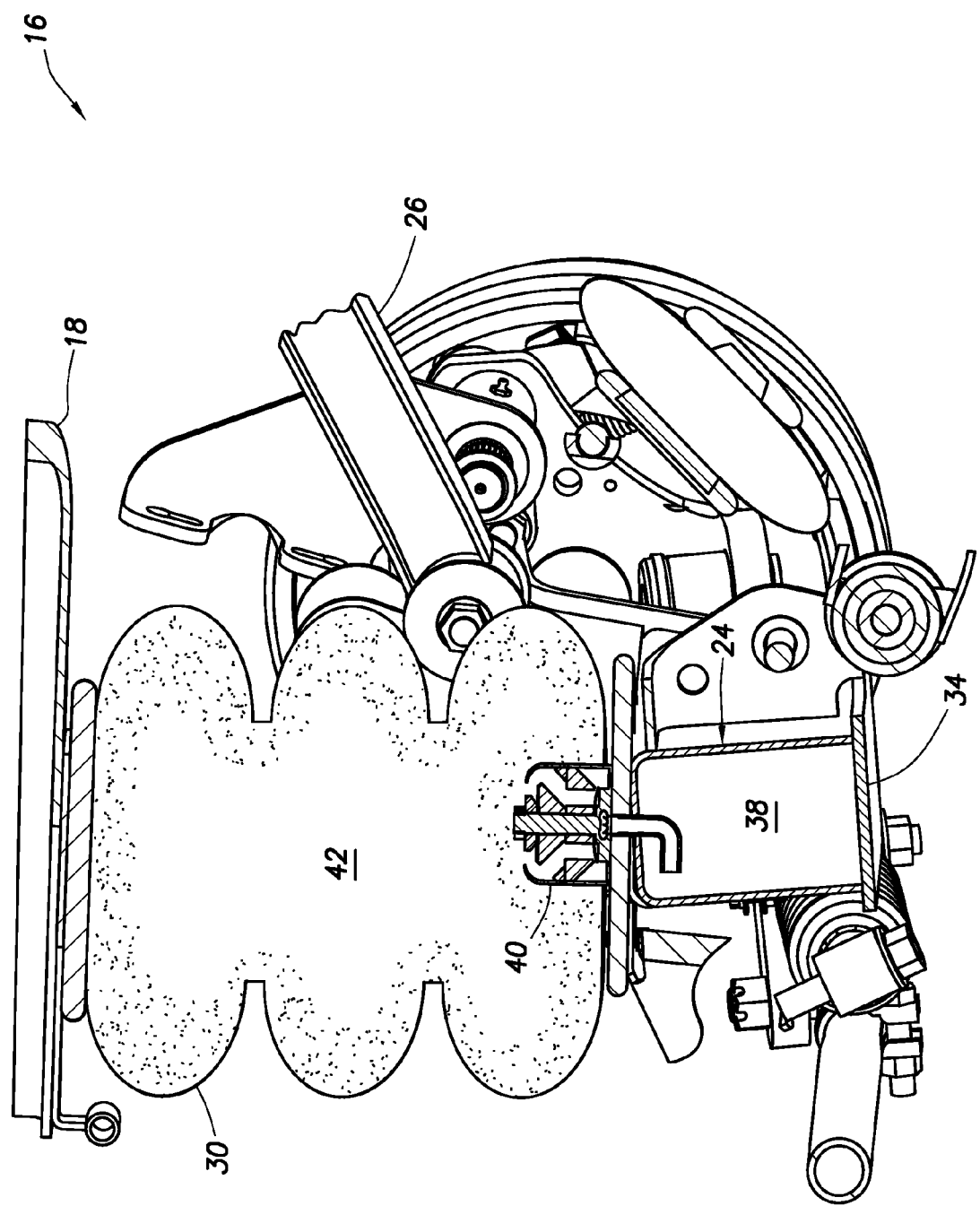
FIG. 5 is a representative cross-sectional view of another example of the suspension system.

Referring additionally now to FIG. 5, another example of the suspension system 16 is representatively illustrated. In this example, the device 40 is connected substantially directly between the air spring internal air volume 42 and the reservoir 38, without use of the hose 32.

The hose 32 can affect the damping characteristics of the suspension system 16. For a particular suspension system, a particular hose configuration (e.g., diameter, length) can be selected to achieve a desired damping, or to at least maximize damping. The FIG. 5 example does not make use of the hose 32, and so the damping characteristics in this example will depend substantially on a construction of the device 40 and a relationship between the reservoir 38 volume and the internal air volume 42 of the air spring 30.

Figure 6:
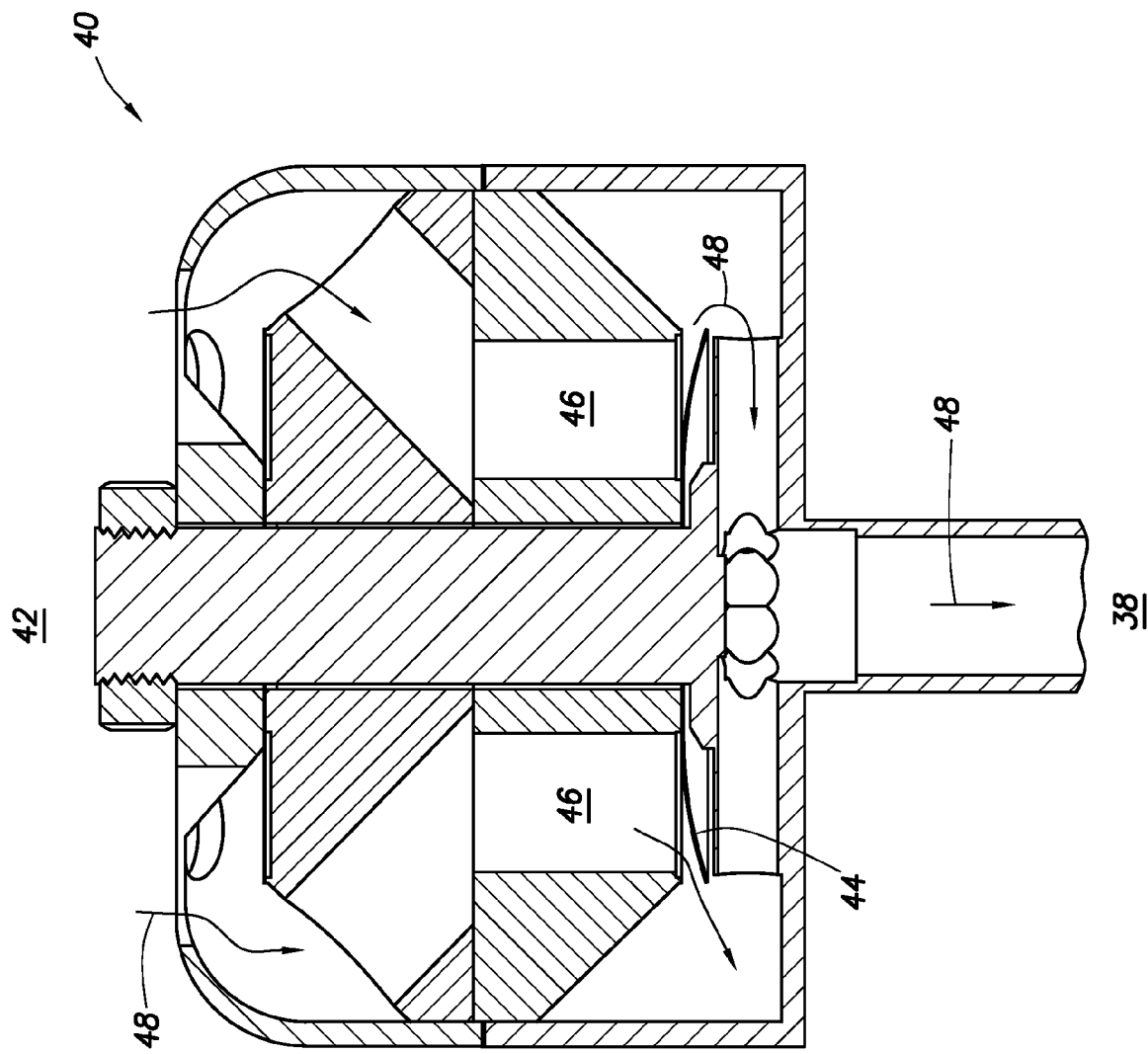
FIG. 6 is an enlarged scale representative cross-sectional view of a flow control device which may be used in the suspension system, with downward flow being permitted through the device.

Referring additionally now to FIG. 6, an enlarged scale cross-sectional view of an example of the flow control device 40 is representatively illustrated. The device 40 may be used in the suspension system 16 described above, or it may be used in other suspension systems.

In the FIG. 6 example, a pressure differential is applied from the air spring internal air volume 42 to the reservoir 38. When the pressure differential reaches a predetermined threshold level, a resilient plate 44 which previously blocked flow through openings 46 will deflect, thereby permitting air 48 to flow from the air spring internal air volume 42 to the reservoir 38 via the openings 46, for example, during compliance of the suspension system 16.

The plate 44, openings 46 and/or other components of the device 40 may be configured so that the predetermined pressure differential is maintained as the air 48 flows through the device. Thus, a velocity of the air 48 may change, and the plate 44 may deflect differently at different velocities of the air, but the pressure differential from the volume 42 to the reservoir 38 can remain substantially unchanged. However, at least the threshold level of pressure differential is required to open the device 40.

Of course, other configurations of the device 40 may be used in keeping with the scope of this disclosure. For example, it is not necessary for the pressure differential across the device 40 to remain substantially unchanged while the air 48 flows through the device, it is not necessary for the plate 44 to be used (other closure members, such as plugs, balls, etc., may be used instead), etc. Thus, the scope of this disclosure is not limited to the construction and operation of the device 40 as depicted in the drawings and described herein.

Figure 7:
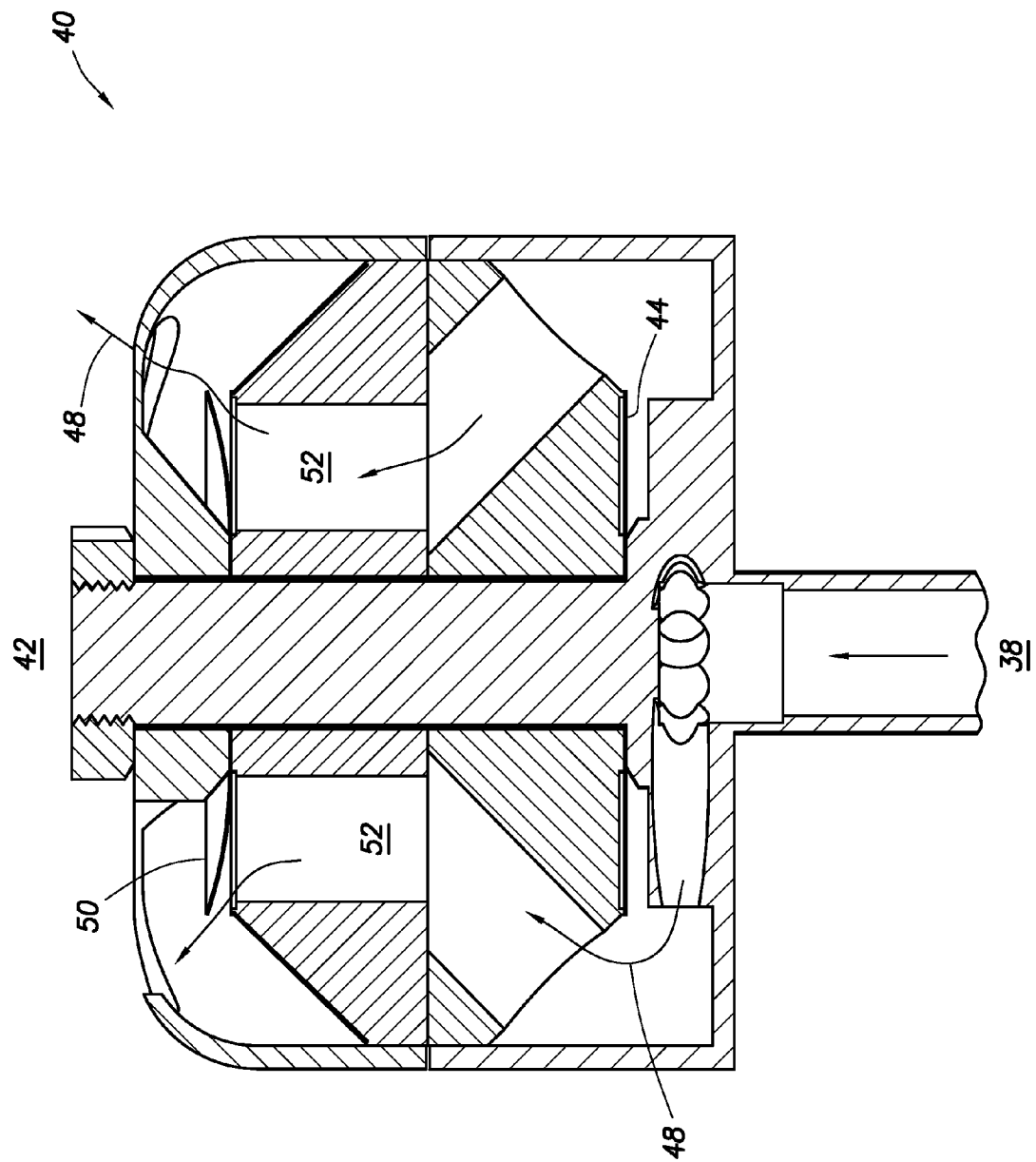
FIG. 7 is a representative cross-sectional view of the flow control device, with upward flow being permitted through the device.
Figure 8A:
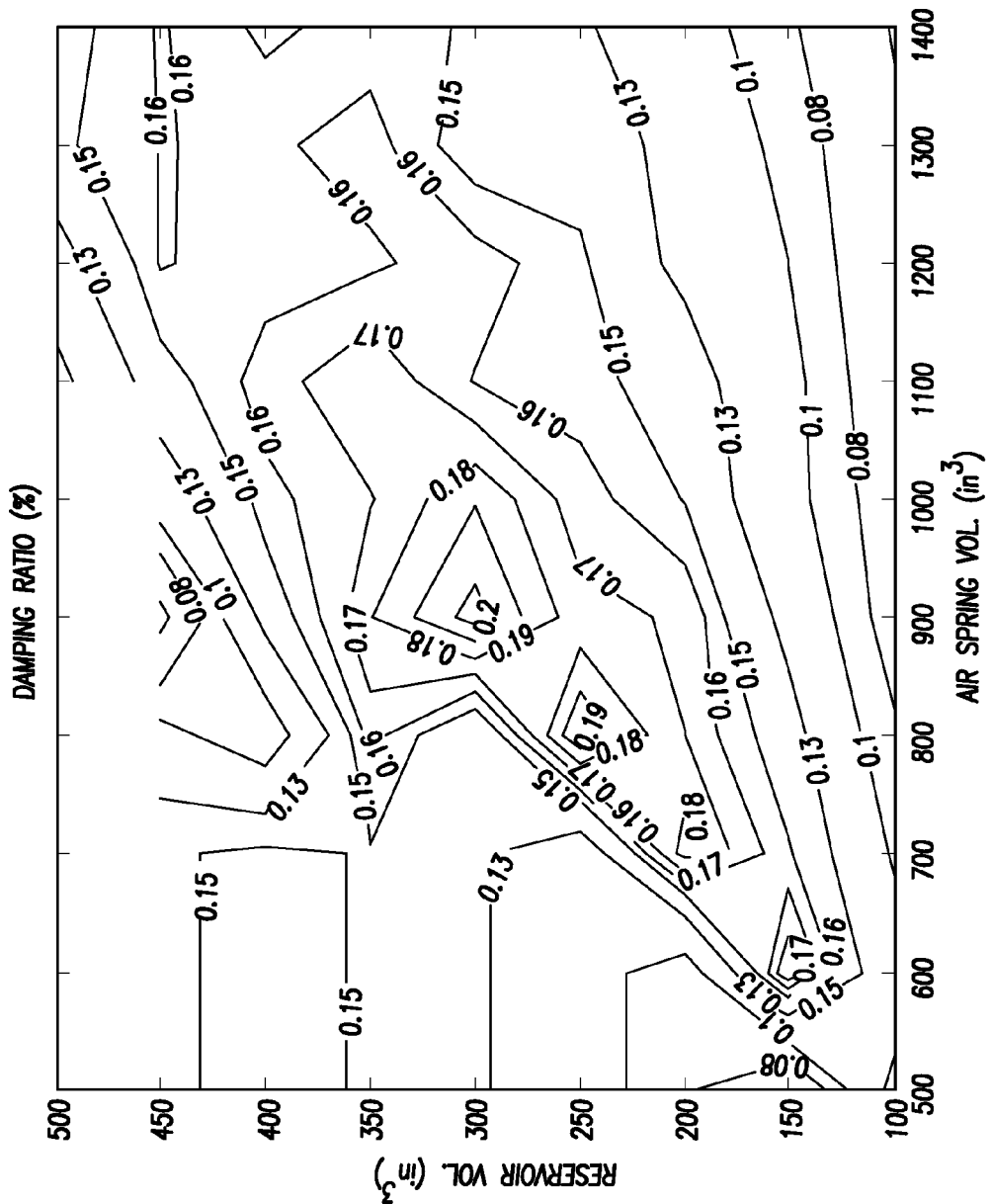
Figure 8B:
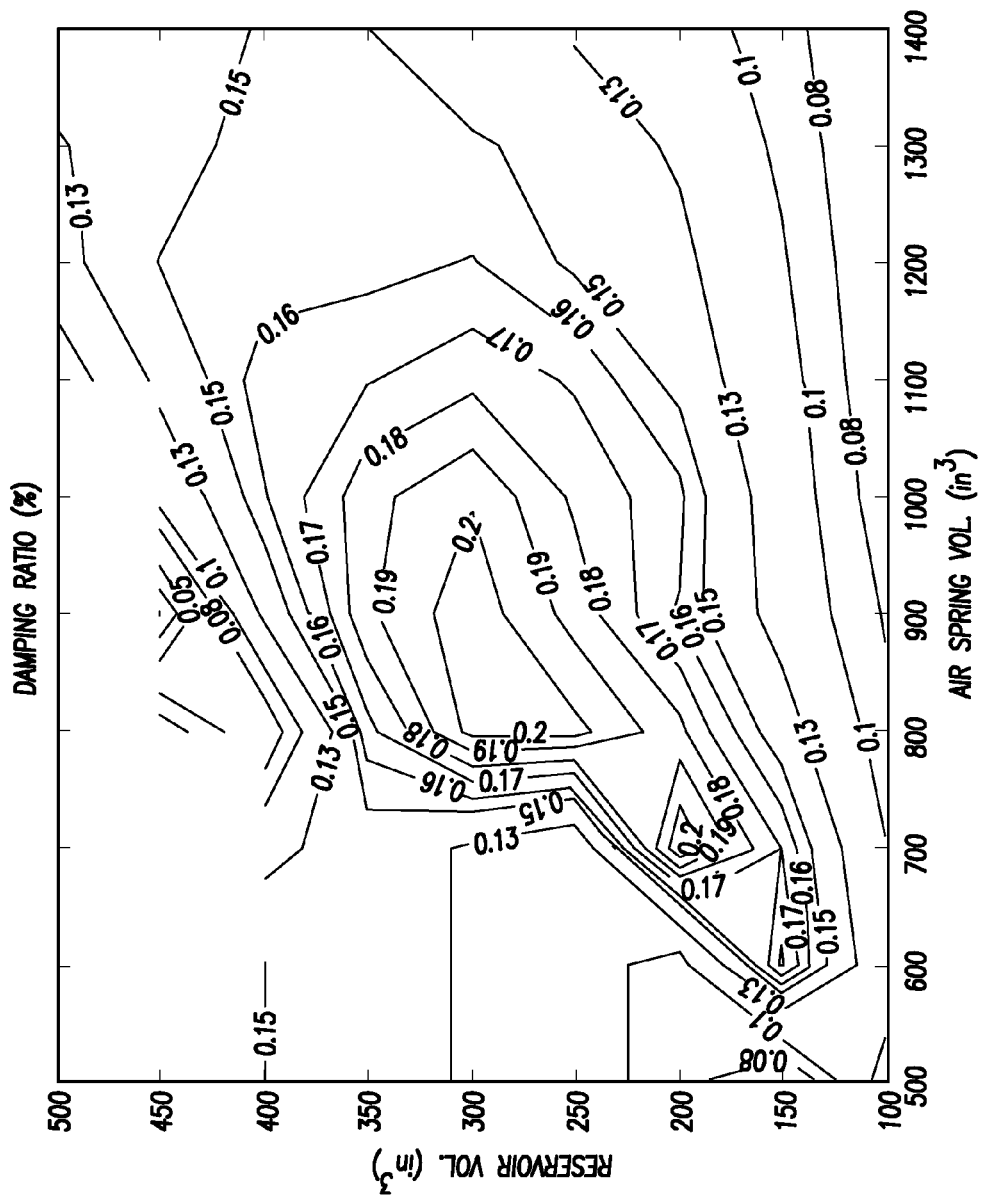
Figure 8C:
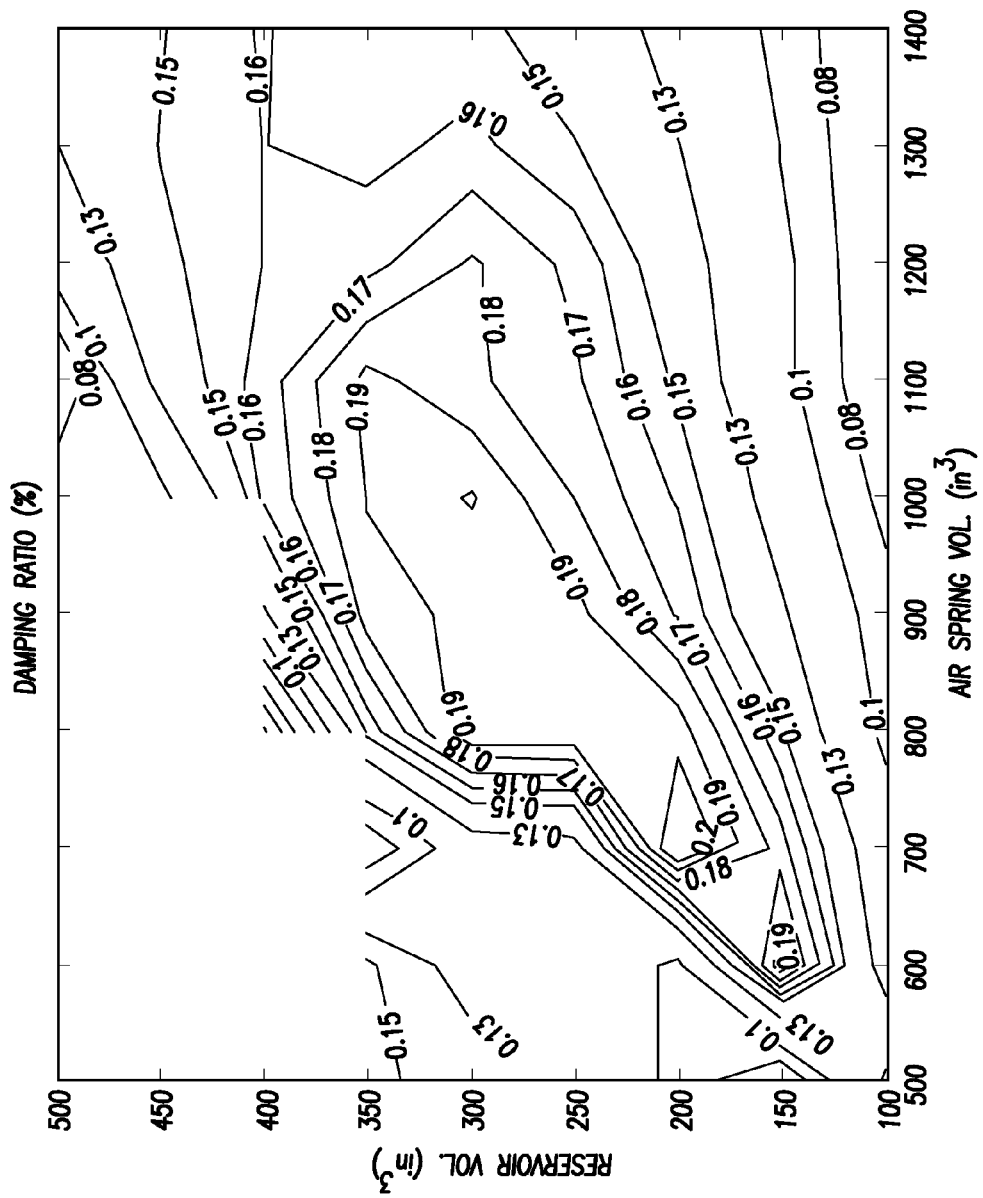
Figure 8E:
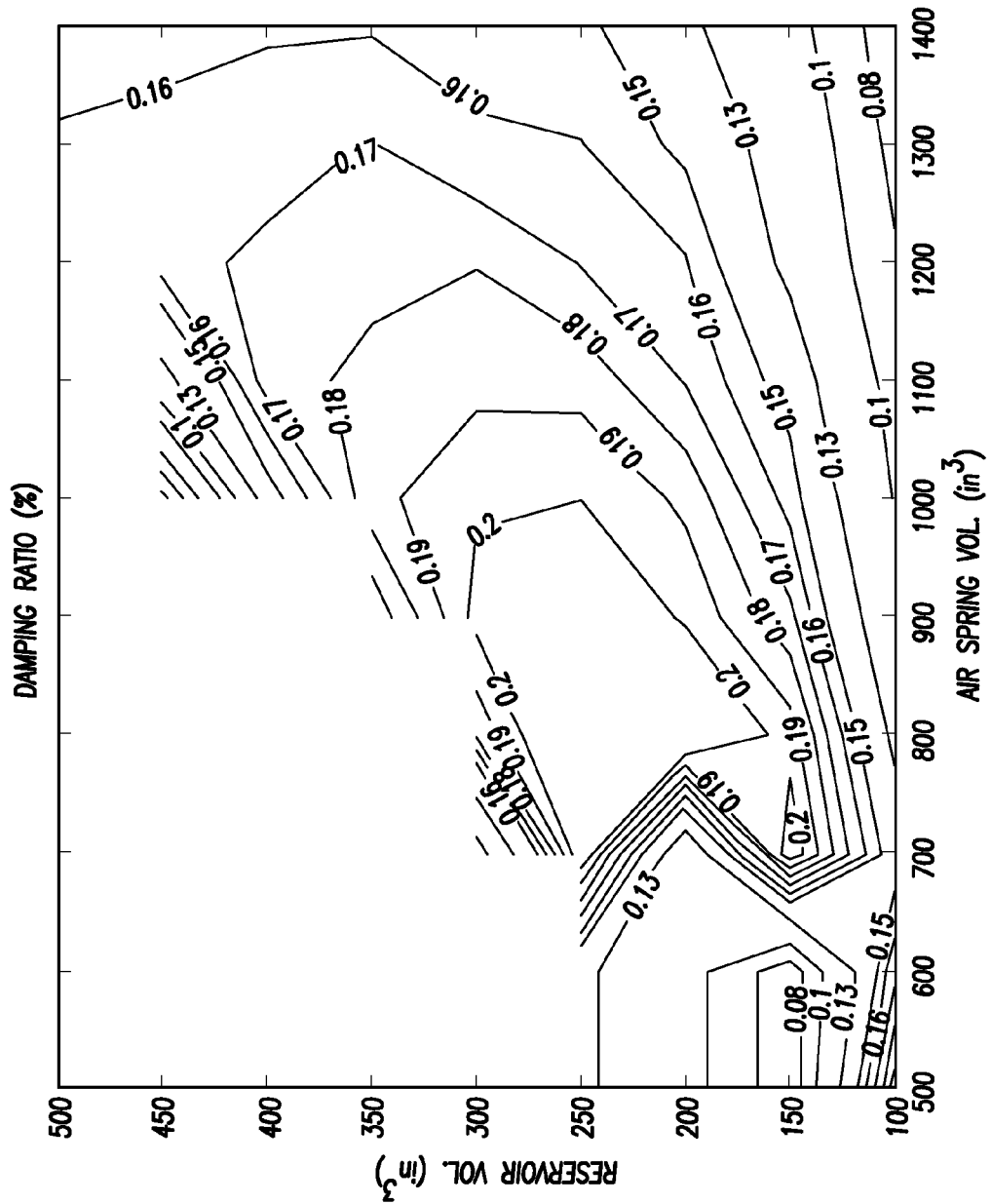
Figure 8F:
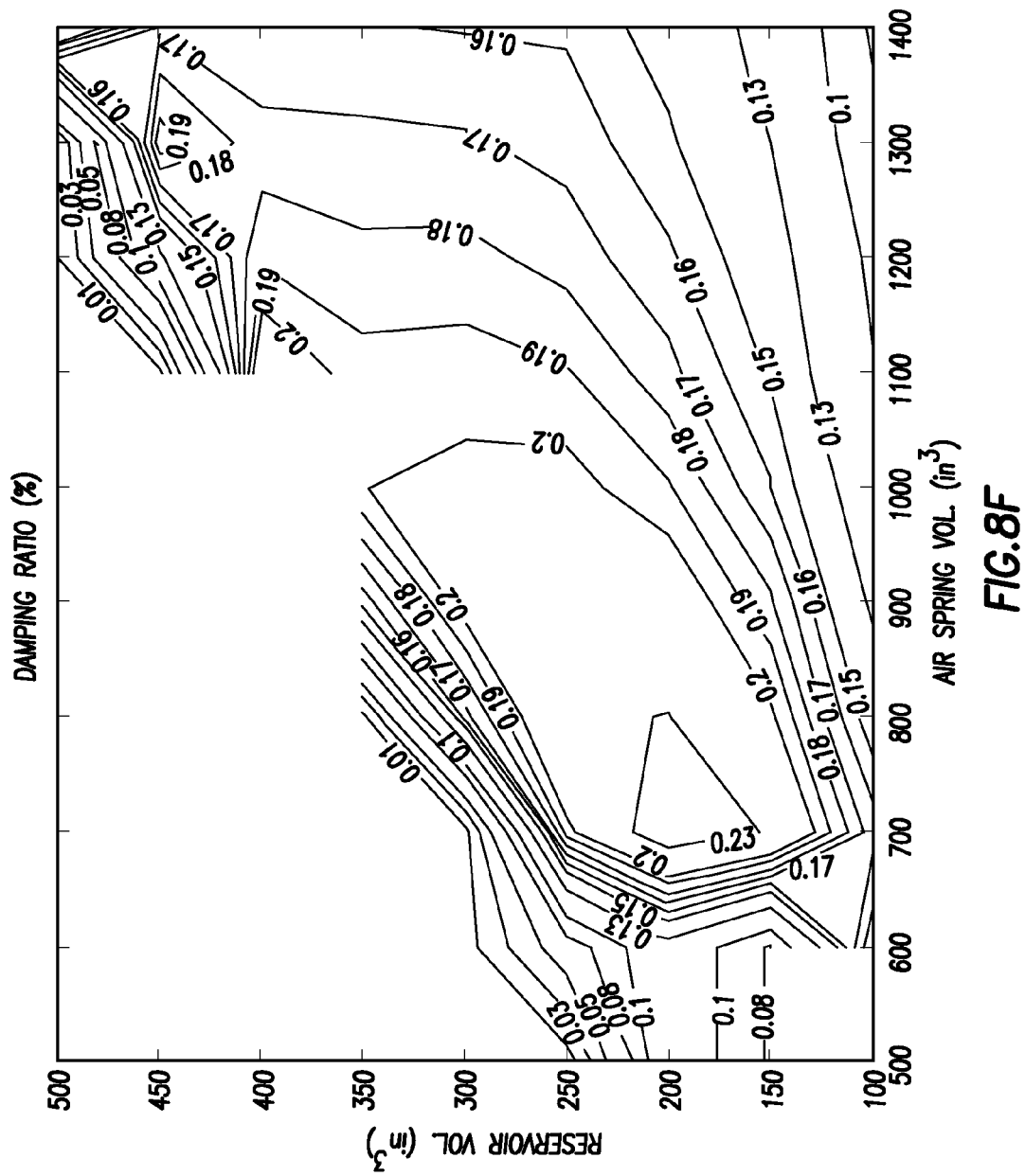

Referring additionally now to FIG. 7, another configuration of the device 40 is representatively illustrated. Note that the cross-sectional view depicted in FIG. 7 is rotated 45 degrees about a vertical axis of the device 40 as compared to FIG. 6, so that openings 52 in the device are visible (however, openings 46 depicted in FIG. 6 are not visible in FIG. 7).

In the FIG. 7 configuration, the air 48 flows from the reservoir 38 to the air spring internal air volume 42 in response to a predetermined threshold level of pressure differential being applied across the device 40 from the reservoir to the air spring internal air volume. A resilient plate 50 deflects due to the pressure differential, thereby permitting flow through the openings 52.

Similar to the FIG. 6 configuration, the plate 50, openings 52 and/or other components of the device 40 may be configured so that the predetermined pressure differential is maintained as the air 48 flows through the device in the FIG. 7 configuration. Thus, a velocity of the air 48 may change, and the plate 50 may deflect differently at different velocities of the air, but the pressure differential from the reservoir 38 to the volume 42 can remain substantially unchanged. However, at least the threshold level of pressure differential is required to open the device 40.

The threshold pressure differential to allow flow from the reservoir 38 to the volume 42 in the FIG. 7 configuration may be the same as, or substantially the same as, the threshold pressure differential to allow flow from the volume 42 to the reservoir 38 in the FIG. 6 configuration, or the threshold pressure differentials may be different. For example, it may be desired to have different damping characteristics for when the air spring 30 is compressing, and for when the air spring is elongating.

Referring additionally now to FIGS. 8A-F, representative graphs are illustrated for a modeled suspension system 16. The FIGS. 8A-F graphs depict damping ratio (expressed as a percentage) versus reservoir 38 volume and air spring internal air volume 42 for various axle loads (30,000 lb., 25,000 lb., 20,000 lb., 13,000 lb., 10,000 lb. and 8,000 lb. axle loads, respectively).

Careful consideration of the FIGS. 8A-F graphs will reveal that maximum damping ratio is achieved when a ratio of reservoir 38 volume to air spring 30 volume is in a range of about 1:2.5 to about 1:6. For example, in FIG. 8A, for a 30,000 lb. axle 24 loading, if the air spring 30 volume is 600 $in^3$, then maximum damping is achieved when the reservoir 38 volume is about 150 $in^3$ (a 1:4 ratio). Similarly, in FIG. 8F, for an 8,000 lb. axle 24 loading, if the air spring 30 volume is 750 $in^3$, then maximum damping is achieved when the reservoir 38 volume is about 200 $in^3$ (a 1:3.75 ratio).

The inventor has found that maximum damping is achieved when the ratio of the reservoir 38 volume to the air spring internal air volume 42 is greater than about 1:2.5. Preferably, the ratio is between about 1:2.5 and about 1:6. Most preferably, the ratio is between about 1:3 and about 1:5.

Note that the air spring internal air volume 42 can change during suspension system compliance (e.g., as the air spring 30 compresses or elongates). Thus, the air spring internal air volume 42 used above for calculation of the ratio of reservoir to air spring volumes is the steady state (substantially no displacement of the axle 24 relative to the frame 18) internal air volume of the air spring 30 at run height.

It may now be fully appreciated that the above disclosure provides significant advancements to the art of damping vehicle suspension systems which use air springs. The reservoir 38 can be conveniently provided in the axle 24, and the ratio of reservoir volume to air spring volume can be tailored to achieve a desired damping, or to at least maximize damping of the suspension system 16.

In one example, a suspension system 16 is provided to the art, which suspension system includes at least one air spring 30, at least one air reservoir 38 external to the air spring 30, and at least one flow control device 40 which variably restricts flow of air 48 between the air spring 30 and the air reservoir 38.

The air spring 30 may have an internal air volume 42 at least 2½ times as great as a volume of the air reservoir 38. A ratio of a volume of the air reservoir 38 to an internal air volume 42 of the air spring 30 can be in a range of approximately 1:2.5 to approximately 1:6.

The air reservoir 38 can be internal to an axle 24 of the suspension system 16. The suspension system 16 can comprise multiple air reservoirs 38 internal to the axle 24, with the air reservoirs being isolated from each other in the axle.

A partition 36 may separate the air reservoirs 38 in the axle 24. The partition 36 may conform to an internal surface of the axle 24 in response to heating of the axle (for example, when welding the bottom plate 34 of the axle).

The flow control device 40 may permit flow from the air spring 30 to the air reservoir 38 when a pressure differential across the device 40 reaches a predetermined level. The flow control device 40 may permit flow from the air reservoir 38 to the air spring 30 when a pressure differential across the device 40 reaches a predetermined level.

The flow control device 40 may permit flow from the air spring 30 to the air reservoir 38 when a pressure differential across the device 40 reaches a first predetermined level, and the flow control device 40 may permit flow from the air reservoir 38 to the air spring 30 when the pressure differential across the device 40 reaches a second predetermined level.

The flow control device 40 may open in response to a predetermined pressure differential level between the air spring 30 and the air reservoir 38.

A suspension system 16 described above can include at least one air spring 30, and at least one air reservoir 38 external to the air spring 30, flow between the air spring 30 and the air reservoir 38 being permitted in response to compliance of the suspension system 16. The air spring 30 has an internal air volume 42 at least 2½ times as great as a volume of the air reservoir 38.

A suspension system 16 described above can include at least one air spring 30, at least one air reservoir 38 external to the air spring 30, and at least one flow control device 40 connected between the air spring 30 and the air reservoir 38. The flow control device 40 permits flow between the air spring 30 and the air reservoir 38 in response to at least one predetermined pressure differential level across the flow control device 40.

A suspension system 16 described above can include multiple air springs 30, multiple air reservoirs 38, each of the reservoirs 38 being connected to a respective one of the air springs 30, and an axle 24. The air reservoirs 38 are internal to the axle 24 and are isolated from each other in the axle 24.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A suspension system, comprising:
    at least one air spring;
    at least one air reservoir external to the air spring, wherein the air spring has an internal air volume at least 2½ times as great as a volume of the air reservoir; and
    at least one flow control device which variably restricts flow of air between the air spring and the air reservoir, wherein a pressure differential between the air spring and the air reservoir acts upon at least one closure member of the flow control device, thereby causing the flow control device to open.

2. The suspension system of claim 1, wherein a ratio of the volume of the air reservoir to the internal air volume of the air spring is in a range of approximately 1:2.5 to approximately 1:6.

3. The suspension system of claim 1, wherein the air reservoir is internal to an axle of the suspension system.

4. The suspension system of claim 1, comprising multiple air reservoirs, wherein the air reservoirs are internal to an axle of the suspension system, and wherein the air reservoirs are isolated from each other in the axle.

5. The suspension system of claim 4, further comprising a partition which separates the air reservoirs in the axle, and wherein the partition conforms to an internal surface of the axle in response to heating of the axle.

6. The suspension system of claim 1, wherein the flow control device permits flow from the air spring to the air reservoir when the pressure differential across the device reaches a predetermined level.

7. The suspension system of claim 1, wherein the flow control device permits flow from the air reservoir to the air spring when the pressure differential across the device reaches a predetermined level.

8. The suspension system of claim 1, wherein the flow control device permits flow from the air spring to the air reservoir when the pressure differential across the device reaches a first predetermined level, and wherein the flow control device permits flow from the air reservoir to the air spring when the pressure differential across the device reaches a second predetermined level.

9. The suspension system of claim 1, wherein the flow control device opens in response to a predetermined pressure differential level between the air spring and the air reservoir.

10. A suspension system, comprising:
   at least one air spring;
   at least one air reservoir external to the air spring, flow between the air spring and the air reservoir being permitted in response to compliance of the suspension system,
   wherein the air spring has an internal air volume at least 2½ times as great as a volume of the air reservoir; and
   at least one flow control device which variably restricts the flow between the air spring and the air reservoir, wherein the flow control device opens in response to a predetermined pressure differential level between the air spring and the air reservoir.

11. The suspension system of claim 10, wherein a ratio of the volume of the air reservoir to the internal air volume of the air spring is in a range of 1:2.5 to approximately 1:6.

12. The suspension system of claim 10, wherein the air reservoir is internal to an axle of the suspension system.

13. The suspension system of claim 10, comprising multiple air reservoirs, wherein the air reservoirs are internal to an axle of the suspension system, and wherein the air reservoirs are isolated from each other in the axle.

14. The suspension system of claim 13, further comprising a partition which separates the air reservoirs in the axle, and wherein the partition conforms to an internal surface of the axle in response to heating of the axle.

15. The suspension system of claim 10, wherein the flow control device permits flow from the air spring to the air reservoir when a pressure differential across the device reaches a predetermined level.

16. The suspension system of claim 10, wherein the flow control device permits flow from the air reservoir to the air spring when a pressure differential across the device reaches a predetermined level.

17. The suspension system of claim 10, wherein the flow control device permits flow from the air spring to the air reservoir when a pressure differential across the device reaches a first predetermined level, and wherein the flow control device permits flow from the air reservoir to the air spring when the pressure differential across the device reaches a second predetermined level.

18. A suspension system, comprising:
   at least one air spring;
   at least one air reservoir external to the air spring, wherein the air spring has an internal air volume at least 2½ times as great as a volume of the air reservoir; and
   at least one flow control device connected between the air spring and the air reservoir, wherein the flow control device permits flow between the air spring and the air reservoir in response to at least one predetermined pressure differential level across the flow control device.

19. The suspension system of claim 18, wherein the flow control device permits flow from the air spring to the air reservoir when a pressure differential across the device reaches the predetermined level.

20. The suspension system of claim 18, wherein the flow control device permits flow from the air reservoir to the air spring when a pressure differential across the device reaches the predetermined level.

21. The suspension system of claim 18, wherein the flow control device permits flow from the air spring to the air reservoir when a pressure differential across the device reaches a first predetermined level, and wherein the flow control device permits flow from the air reservoir to the air spring when the pressure differential across the device reaches a second predetermined level.

22. The suspension system of claim 18, wherein a ratio of the volume of the air reservoir to the internal air volume of the air spring is in a range of approximately 1:2.5 to approximately 1:6.

23. The suspension system of claim 18, wherein the air reservoir is internal to an axle of the suspension system.

24. The suspension system of claim 18, comprising multiple air reservoirs, wherein the air reservoirs are internal to an axle of the suspension system, and wherein the air reservoirs are isolated from each other in the axle.

25. The suspension system of claim 24, further comprising a partition which separates the air reservoirs in the axle, and wherein the partition conforms to an internal surface of the axle in response to heating of the axle.

26. A suspension system, comprising:
   multiple air springs;
   multiple air reservoirs, each of the air reservoirs being connected to a respective one of the air springs, wherein each air spring has an internal air volume at least 2½ times as great as a volume of the respective air reservoir;
   an axle, the air reservoirs being internal to the axle and isolated from each other in the axle; and
   multiple flow control devices, each of the flow control devices variably restricting flow of air between a respective one of the air reservoirs and the respective air spring, wherein a pressure differential between the respective air reservoir and the respective air spring acts upon at least one closure member of a respective one of the flow control devices, thereby causing the respective flow control device to open.

27. The suspension system of claim 26, further comprising a partition which separates the air reservoirs in the axle, and wherein the partition conforms to an internal surface of the axle in response to heating of the axle.

28. The suspension system of claim 26, wherein a ratio of the volume of each air reservoir to the internal air volume of the respective air spring is in a range of approximately 1:2.5 to approximately 1:6.

29. The suspension system of claim 26, wherein each flow control device permits flow from the respective air spring to the respective air reservoir when the pressure differential across the device reaches a predetermined level.

30. The suspension system of claim 26, wherein each flow control device permits flow from the respective air reservoir to the respective air spring when the pressure differential across the device reaches a predetermined level.

31. The suspension system of claim 26, wherein each flow control device permits flow from the respective air spring to the respective air reservoir when the pressure differential across the device reaches a first predetermined level, and wherein each flow control device permits flow from the respective air reservoir to the respective air spring when the pressure differential across the device reaches a second predetermined level.

32. The suspension system of claim 26, wherein each flow control device opens in response to a predetermined pressure differential level between the respective air spring and the respective air reservoir.

* * * * *